United States Patent
Ono

(10) Patent No.: US 8,894,915 B2
(45) Date of Patent: Nov. 25, 2014

(54) HONEYCOMB STRUCTURE AND MANUFACTURING METHOD THEREOF

(75) Inventor: Yoshiro Ono, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 791 days.

(21) Appl. No.: 12/230,021

(22) Filed: Aug. 21, 2008

(65) Prior Publication Data

US 2008/0315468 A1 Dec. 25, 2008

Related U.S. Application Data

(62) Division of application No. 11/357,949, filed on Feb. 22, 2006, now abandoned.

(30) Foreign Application Priority Data

Mar. 17, 2005 (JP) .................................. 2005-077033

(51) Int. Cl.
*C04B 35/195* (2006.01)
*C04B 33/32* (2006.01)

(52) U.S. Cl.
USPC ........................................................ 264/630

(58) Field of Classification Search
CPC ............ C04B 38/0006; C04B 38/0009; C04B 35/195; C04B 38/0054; C04B 38/0074
USPC ................................................. 264/630, 631
See application file for complete search history.

(56) References Cited

U.S. PATENT DOCUMENTS

| | | | |
|---|---|---|---|
| 3,950,175 A * | 4/1976 | Lachman et al. ............... 501/80 |
| 4,869,944 A | 9/1989 | Harada et al. | |
| 5,545,243 A | 8/1996 | Kotani et al. | |
| 5,849,391 A | 12/1998 | Miura et al. | |
| 6,087,281 A | 7/2000 | Merkel | |
| 6,214,437 B1 | 4/2001 | Beall et al. | |
| 6,291,379 B1 | 9/2001 | Noguchi et al. | |
| 6,432,856 B1 | 8/2002 | Beall et al. | |
| 6,506,336 B1 * | 1/2003 | Beall et al. ..................... 264/630 |
| 7,520,911 B2 * | 4/2009 | Beall et al. ....................... 55/523 |
| 2002/0130447 A1 * | 9/2002 | Beall et al. ..................... 264/630 |
| 2003/0012923 A1 | 1/2003 | Beall et al. | |
| 2004/0148916 A1 * | 8/2004 | Merkel ........................... 55/523 |
| 2005/0069469 A1 * | 3/2005 | Fu et al. ........................ 422/177 |
| 2006/0270546 A1 * | 11/2006 | Wusirika ........................ 501/119 |
| 2007/0141301 A1 * | 6/2007 | Boorom et al. ................ 428/116 |

FOREIGN PATENT DOCUMENTS

| | | |
|---|---|---|
| EP | 0 278 749 A1 | 8/1988 |
| EP | 0 753 490 A1 | 1/1997 |

(Continued)

OTHER PUBLICATIONS

Sasol Disperal®/Dispal® High purity dispersible aluminas. Datasheet [online]. Sasol Alumina, 2007 [retrieved Jan. 5, 2011]. Retrieved from the Internet <URL: http://www.sasolgermany.de/fileadmin/doc/alumina/DISPERAL-DISPAL.GB_04.pdf>.*

*Primary Examiner* — Erin Snelting

(74) *Attorney, Agent, or Firm* — Oliff PLC

(57) ABSTRACT

A honeycomb structure is made of cordierite and has a plurality of cells separated from each other by porous partition walls and functioning as fluid passages. The honeycomb structure has a thermal expansion coefficient of $0.25 \times 10^{-6}/°$ C. or less, an average pore diameter is 3 to 8 μm, and a porosity of 25% or more. The honeycomb structure is made of cordierite excellent in thermal shock resistance even with large pore diameters and high porosity.

6 Claims, 1 Drawing Sheet

(56) References Cited

FOREIGN PATENT DOCUMENTS

| JP | A-64-003067 | 1/1989 |
|---|---|---|
| JP | A-7-163823 | 6/1995 |
| JP | A-2000-226253 | 8/2000 |
| JP | A-2001-524452 | 12/2001 |
| JP | A-2003-040687 | 2/2003 |
| WO | WO 99/28270 A1 | 6/1999 |
| WO | WO 01/04070 A1 | 1/2001 |

* cited by examiner

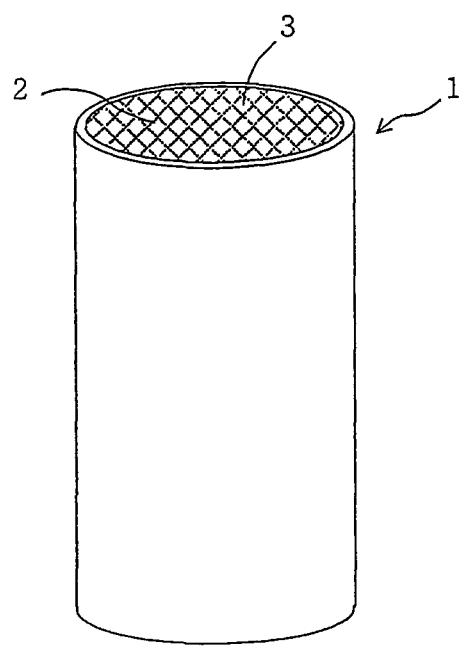

HONEYCOMB STRUCTURE AND MANUFACTURING METHOD THEREOF

This is a Division of application Ser. No. 11/357,949 filed Feb. 22, 2006, which claims priority to JP 2005-077033 filed Mar. 17, 2005. The disclosure of the prior applications is hereby incorporated by reference herein in its entirety.

BACKGROUND OF THE INVENTION AND RELATED ART STATEMENT

The present invention relates to a honeycomb structure and a manufacturing method thereof. More specifically, the present invention relates to a honeycomb structure made of cordierite having excellent thermal shock resistance even with large pore diameters and high porosity and to a method for manufacturing such a honeycomb structure, the method being capable of manufacturing such a honeycomb structure with high precision in size.

In recent years is high-lightened an influence of harmful substances such as particulate and $NO_x$ contained in exhaust gas discharged from automobile engines such as a diesel engine on the environment. As an important means for removing such harmful substances, a use of a honeycomb structure is variously examined.

FIG. 1 is a perspective view schematically showing an example of a honeycomb structure. As shown in FIG. 1, the honeycomb structure 1 has a plurality of through-holes (cells 3) separated from each other by porous partition walls 2 and functioning as fluid passages. The honeycomb structure has a structure of plugging in mutually different sites at both end faces where the cells are open, and development of use of the honeycomb structure has been proceeding as a filter (honeycomb filter) for trapping and removing particulate matters in exhaust gas by allowing exhaust gas to flow into each of the cells 3 opening at one end face to compulsorily pass the exhaust gas through the porous partition walls 2. Also, development of use of the honeycomb structure has been proceeding as a catalyst body carrying a catalyst which decomposes HC and $NO_x$ on the partition walls 2 to purify exhaust gas. As a material constituting such a honeycomb structure, there has suitably been used a cordierite having a low thermal expansion coefficient and high thermal shock resistance.

When a honeycomb structure is used as a filter, it is naturally required that it has high trapping efficiency. After a certain period of use, the honeycomb structure is generally subjected to a regeneration treatment where accumulated soot is combusted at high temperature to be burned down. When the regeneration treatment is conducted with high frequency, deterioration of the honeycomb structure is promoted. Therefore, there is a requirement of reducing the number of regeneration treatments with making trapping time longer.

Meanwhile, when a honeycomb structure is used as a catalyst carrier, there has been required in recent years an increase in an amount of catalyst to be loaded on the honeycomb structure in order to further improve exhaust gas purification performance. In order to increase the amount of catalyst to be loaded, it is desirable to rise porosity of the honeycomb structure. The honeycomb structure having larger pore diameters is more desirable. In any of the cases that a honeycomb structure is used as a filter and that a honeycomb structure is used as a catalyst body, the honeycomb structure is disposed near the engine and exposes to thermal shock continuously. Therefore, the honeycomb structure is required to have sufficient thermal shock resistance.

A honeycomb structure made of cordierite can be manufactured by preparing clay by the use of a cordierite-forming raw material containing an alumina source, forming the clay obtained into a honeycomb shape to obtain a honeycomb formed body, and drying and firing the honeycomb formed body (see, e.g., JP-A-2003-40687). There is also disclosed a honeycomb product made of cordierite using boehmite having a BET specific surface area of 20 $m^2/g$ as an alumina source for the purpose of enhancing thermal shock resistance by reducing a thermal expansion coefficient (see, e.g., JP-A-2001-524452).

However, a honeycomb product manufactured in a method disclosed in the Patent Document 2 has a small average pore diameter of about 1.5 μm. Therefore, since such a honeycomb product has high strength, it is disadvantageous to catalyst loading, while thermal shock resistance is improved, and a problem of difficulty in loading a sufficient amount of catalyst arises.

SUMMARY OF THE INVENTION

The present invention has been made in view of such a problem prior art has and aims to provide a honeycomb structure made of cordierite having excellent thermal shock resistance even with large pore diameters and high porosity and to a method for manufacturing a honeycomb structure made of cordierite having excellent thermal shock resistance even with large pore diameters and high porosity, the method being capable of manufacturing such a honeycomb structure with high precision in size.

As a result of the present inventors' keen investigation to achieve the above aim, they found out that the above aim can be achieved by allowing the cordierite-forming raw material as a raw material for the manufacture to contain an alumina source having an appropriate BET specific surface area at a predetermined ratio and allowing the alumina source to contain fine boehmite at a predetermined ratio, thereby enabling the thermal expansion coefficient of the resultant honeycomb structure to be lowered and enabling an appropriate distribution of pores to be imparted to the honeycomb structures, which led to the accomplishment of the present invention.

That is, according to the present invention, there is provided the following honeycomb structure and manufacturing method thereof.

[1] A honeycomb structure made of cordierite and having a plurality of cells separated from each other by porous partition walls and functioning as fluid passages, wherein the honeycomb structure has a thermal expansion coefficient of $0.25 \times 10^{-6}/°C$. or less, an average pore diameter is 3 to 8 μm, and a porosity of 25% or more.

[2] A honeycomb structure according to the above [1], wherein a thermal shock resistance temperature measured in a thermal shock resistance test is 800° C. or more.

[3] A honeycomb structure according to the above [1] or [2], wherein a thermal expansion coefficient is $0.2 \times 10^{-6}/°C$. or less.

[4] A method for manufacturing a honeycomb structure, comprising the steps of:

forming clay containing cordierite-forming raw material satisfying the following conditions 1 and 2 in a honeycomb shape to obtain a formed body, and drying and firing the formed body to obtain the honeycomb structure having a plurality of cells separated from each other by porous partition walls and functioning as fluid passages and a thermal expansion coefficient of $0.25 \times 10^{-6}/°C$. or less, an average pore diameter is 3 to 8 μm, and a porosity of 25% or more:

Condition 1: An alumina source having a BET specific surface area of 10 m²/g or more is contained in an amount of 13 to 28% by mass.

Condition 2: Boehmite ($Al_2O_3 \cdot H_2O$) having an average particle size of 1 μm or less is contained in at least a part of the alumina source at a ratio of 0.45 to 15.8% by mass with respect to the cordierite-forming raw material.

[5] A method for manufacturing a honeycomb structure according to the above [4], wherein the boehmite ($Al_2O_3 \cdot H_2O$) has a BET specific surface area of 80 m²/g or more.

[6] A method for manufacturing a honeycomb structure according to the above [4] or [5], wherein the cordierite-forming raw material further contains 8% by mass or less of silica.

[7] A method for manufacturing a honeycomb structure according to the above [4] or [6], wherein the alumina source further contains alumina and/or aluminum hydroxide.

[8] A method for manufacturing a honeycomb structure according to the above [4] or [7], wherein the alumina source has a BET specific surface area of 20 m²/g or more.

BRIEF DESCRIPTION OF THE DRAWINGS

FIG. 1 is a perpendicular view schematically showing an example of a honeycomb structure.

DETAILED DESCRIPTION OF THE INVENTION

A honeycomb structure of the present invention takes effect of excellent thermal shock resistance even with large pore diameters and high porosity. In addition, according to a method for manufacturing a honeycomb structure of the present invention, a honeycomb structure made of cordierite having excellent thermal shock resistance even with large pore diameters and high porosity can be manufactured with high precision in size.

The best mode for carrying the present invention will hereinbelow be described. However, the present invention is by no means limited to the following embodiments, and it should be understood that even if an appropriate change, improvement, or the like, may be given to the following embodiments within the range of not deviating from the gist of the present invention, they are within the range of the present invention on the basis of those skilled in the art.

First, an embodiment of a honeycomb structure of the present invention will be described. A honeycomb structure of the present embodiment is made of cordierite and has a plurality of cells separated from each other by porous partition walls and functioning as fluid passages with a thermal expansion coefficient of $0.25 \times 10^{-6}/°$ C. or less, an average pore diameter of 3 to 8 μm, and a porosity of 25% or more. Description on details are as follows:

A honeycomb structure of the present invention has a thermal expansion coefficient is $0.25 \times 10^{-6}/°$ C. or less. This is within the range of having excellent thermal shock resistance in the case that all honeycomb structures and shapes are taken into consideration. When the thermal expansion coefficient is above $0.25 \times 10^{-6}/°$ C., sufficient thermal shock resistance cannot be obtained in the case of a structure having high porosity and large capacity. From the viewpoint of imparting superior thermal shock resistance, it is preferable that a honeycomb structure of the present embodiment has a thermal expansion coefficient of $0.2 \times 10^{-6}/°$ C. or less.

A honeycomb structure of the present embodiment has an average pore diameter of 3 to 8 μm. When the average pore diameter is below 3 μm, it is difficult to obtain sufficient trapping efficiency in the case of using the honeycomb structure as a filter. In the case of using the honeycomb structure as a catalyst carrier, it is difficult to load a sufficient amount of catalyst on the honeycomb structure. On the other hand, when an average pore diameter is above 8 μm, it is difficult to secure sufficient physical strength. Incidentally, from the viewpoint of securing physical strength with securing trapping efficiency and enabling a sufficient amount of catalyst to be loaded, it is preferable that a honeycomb structure of the present embodiment has an average pore diameter of 4 to 6 μm.

In addition, a honeycomb structure of the present embodiment has a porosity of 25% or more. When the porosity is below 25%, it is difficult to obtain sufficient trapping efficiency in the case of using the honeycomb structure as a filter. In the case of using the honeycomb structure as a catalyst carrier, it is difficult to load a sufficient amount of catalyst on the honeycomb structure. Incidentally, from the viewpoint of securing physical strength with securing trapping efficiency and enabling a sufficient amount of catalyst to be loaded, it is preferable that a honeycomb structure of the present embodiment has a porosity of 30% or more. Though there is no particular limitation on the upper limit of the porosity of a honeycomb structure of the present embodiment, the porosity is preferably 70% or less in consideration of practical producibility, maintaining necessary physical strength, and the like (inclusive of the case where the structure is used as a filter).

As described above, a honeycomb structure of the present embodiment has a small thermal expansion coefficient and excellent thermal shock resistance. Specifically, a honeycomb structure of the present embodiment has a thermal shock resistance temperature measured by a thermal shock resistance test of preferably 800° C. or more, further preferably 850° C. or more. Though there is no particular limitation on the upper limit of the thermal shock resistance temperature measured by a thermal shock resistance test of the honeycomb structure of the present embodiment, it is 950° C. or less with regard to the one having required porosity and a practical shape and size from the view point.

Here, a method for carrying out the "thermal shock resistance test" in the present specification is described. In the thermal shock resistance test, a honeycomb structure is put in an electric furnace heated up to a predetermined temperature in advance to be heated for a sufficient period of time, followed by being air-cooled. A thermal shock due to quick cooling may cause cracks on a side face, on an end face, or inside the structure. In the case that no crack is caused upon cooling down to room temperature, the structure is considered that it has cleared the heating temperature. Cracks are detected by eye observation, strike sound, and the like. The honeycomb structure which has cleared the heating temperature is heated until a crack is caused by 50° C. The highest temperature with no crack caused is defined as "thermal shock resistance temperature (° C.).

In the present specification, "average pore diameter" means a value measured by a method of mercury penetration and can be measured by a mercury penetration type porosimeter. "Porosity" means a value (Po) calculated by the following formula (1) from the whole pore volume (V) measured by the method of mercury penetration of the honeycomb structure (porous body) and absolute specific gravity ($d_t$) ($d_t$=2.52 g/cm² in the case of cordierite).

$$Po=\{V/(V+1/d_t)\} \times 100 \quad (1)$$

An example of the whole structure of a honeycomb structure of the present embodiment is shown in FIG. 1. However, the whole shape and the cell shape of a honeycomb structure are not limited to this. Examples of the whole shape include a quadrangular prism and a triangular prism besides a cylinder as shown in FIG. 1. Examples of the cell shape (shape of cells 3 in a cross section perpendicular to the fluid flow direction) include a hexagon, a triangle, and a circle besides a square as shown in FIG. 1. Incidentally, a honeycomb structure of the present embodiment can be used as a catalyst carrier by loading a catalyst on a porous partition wall surface or in pores. Alternatively, a honeycomb structure of the present embodiment can be used as a filter by alternately plugging one opening and the other opening of a plurality of cells.

When a honeycomb structure of the present embodiment is used as a catalyst carrier, it is preferable that the honeycomb structure has a cell density of 6 to 1500 cells/inch$^2$ (0.9 to 233 cells/cm$^2$) and a partition wall thickness of 50 to 2000 μm (about 2 to 79 mil). Also, the honeycomb structure has a length (whole length of a honeycomb structure) of usually 60 to 300 mm, preferably 100 to 250 mm, in the fluid flow direction.

Next, an embodiment of a method for manufacturing a honeycomb structure will be described. A method for manufacturing a honeycomb structure of the present embodiment includes the steps of: forming clay containing cordierite-forming raw material satisfying the following conditions 1 and 2 in a honeycomb shape to obtain a formed body, and drying and firing the formed body to obtain the honeycomb structure having a plurality of cells separated from each other by porous partition walls and functioning as fluid passages and a thermal expansion coefficient of $0.25 \times 10^{-6}/°C$. or less, an average pore diameter is 3 to 8 μm, and a porosity of 25% or more:

Condition 1: An alumina source having a BET specific surface area of 10 m$^2$/g or more is contained in an amount of 13 to 28% by mass.
Condition 2: Boehmite ($Al_2O_3.H_2O$) having an average particle size of 1 μm or less is contained in at least a part of the alumina source at a ratio of 0.45 to 15.8% by mass with respect to the cordierite-forming raw material.

A cordierite-forming raw material used in a method for manufacturing a honeycomb structure of the present embodiment contains 13 to 28% by mass of an alumina source having a BET specific surface area of 10 m$^2$/g or more (Condition 1). By allowing the cordierite-forming raw material to contain a fine alumina source having a predetermined BET specific surface area or more at a predetermined ratio or more, a honeycomb structure having a small thermal expansion coefficient and excellent thermal shock resistance. When the alumina source has a BET specific surface area of below 10 m$^2$/g, it is impossible to obtain a honeycomb structure having a sufficiently small thermal expansion coefficient and excellent thermal shock resistance. When the ratio of the alumina source having a BET specific surface area of 10 m$^2$/g or more is below 13% by mass, it is impossible to obtain a honeycomb structure having a sufficiently small thermal expansion coefficient and excellent thermal shock resistance. On the other hand, when the ratio is above 28% by mass, shrinkage in size upon firing is large, and the honeycomb structure tends to become dense. Therefore, it has a tendency of having lowered porosity, deterioration in size precision, and increase in shape inferiority.

The alumina source contained in the cordierite-forming raw material has a BET specific surface area of preferably 20 m$^2$/g or more, further preferably 40 m$^2$/g or more. In addition, the ratio of the alumina source contained in the cordierite-forming raw material is preferably 8.8 to 27.4% by mass, and further preferably 15.0 to 22.0% by mass.

In the cordierite-forming material to be used in a method for manufacturing a honeycomb structure of the present embodiment, boehmite ($Al_2O_3.H_2O$) having an average particle size of 1 μm or less is contained in at least a part of the alumina source at a ratio of 0.45 to 15.8% by mass with respect to the cordierite-forming raw material (Condition 2). When fine boehmite having an average particle size of 1 μm or less is used as at least a part of the alumina source at a predetermined ratio, the thermal expansion coefficient is lowered because a cordierite-forming reaction is accelerated, and a honeycomb structure suitable as a catalyst carrier can be produced. When the boehmite has an average particle size of above 1 μm, the thermal expansion coefficient of the honeycomb structure obtained cannot be lowered. When the ratio of the boehmite having an average particle size of below 1 μm to the cordierite-forming raw material is lower than 0.45% by mass, thermal shock resistance of the honeycomb structure obtained cannot be enhanced sufficiently from the same viewpoint. On the other hand, when the ratio is above 15.8% by mass, a large amount of shrinkage is caused upon drying and firing, and it is difficult to produce a honeycomb structure having an aimed structure with high precision in size.

The boehmite contained in an alumina source may be either boehmite or a pseudo-boehmite with an average particle size of preferably 1 μm or less, more preferably 0.5 μm or less. The ratio of the boehmite contained in the alumina source is preferably 1.0 to 14.0% by mass, further preferably 4.0 to 12.0% by mass with respect to the cordierite-forming raw material. Incidentally, when the ratio of the boehmite contained is increased, it has the advantage of lowering the thermal expansion coefficient of the honeycomb structure obtained, and further, firing temperature can preferably be lowered.

In the present specification, "average particle size" means a value of 50% particle size measured by a laser diffraction/scattering type particle size measuring device (e.g., Commercial name: "LA-910" produced by Horiba, Ltd.) where a light diffraction method is applied as the measurement principle. Incidentally, the measurement is performed in the condition that the raw material is completely dispersed in water.

In a method for manufacturing a honeycomb structure of the present embodiment, the boehmite contained in at least a part of the alumina source has a BET specific surface area of preferably 80 m$^2$/g or more, further preferably 100 m$^2$/g or more, and particularly preferably 150 m$^2$/g or more. When a BET specific surface area of the boehmite exceeds the above value, a honeycomb structure having excellent thermal shock resistance can be manufactured.

In a method for manufacturing a honeycomb structure of the present embodiment, it is preferable that silica is contained in the cordierite-forming raw material at a ratio of 8% by mass or less. When silica is contained in the cordierite-forming raw material at a predetermined ratio, lowering of the porosity by boehmite can be complemented by a pore-increasing effect of silica, and a honeycomb structure having a desired porosity and pore diameter can be obtained. In addition, shrinkage upon firing can be reduced, and a honeycomb structure having an aimed structure can be manufactured with high size precision. Therefore, by using silica, an amount of boehmite can be increased, and a honeycomb structure having low thermal expansion can be obtained. Incidentally, the lower limit of the ratio of silica contained in the cordierite-forming raw material is not particularly limited, it is preferably 0.5% by mass or more in order to exhibit an effect of containing silica.

In a method for manufacturing a honeycomb structure of the present embodiment, it is preferable that alumina and/or aluminum hydroxide is further contained in the alumina source because a honeycomb structure having higher porosity and further suitable as a catalyst carrier can be manufactured. Incidentally, the ratio of alumina contained in the case that alumina is contained in the alumina source is preferably 20% by mass or less, further preferably 5 to 18% by mass, with respect to the cordierite-forming raw material. The ratio of aluminum hydroxide in the case that aluminum hydroxide is contained in the alumina source is preferably 28% by mass or less, further preferably 4 to 23% by mass, with respect to the cordierite-forming raw material. However, among alumina, for example, activated alumina obtained by calcining aluminum hydroxide and having a high specific surface area is not preferable because it increases the thermal expansion coefficient of the resultant honeycomb structure.

Next, a method for manufacturing a honeycomb structure of the present embodiment is described in more detail by each step. First, an alumina source raw material, a silica source raw material, and a magnesia source raw material, which serve as an alumina source, a silica source, and a magnesia source in a cordierite composition, are added to obtain a cordierite-forming raw material. To the cordierite-forming raw material is added a dispersion medium such as water, and they are mixed and kneaded to give clay. The cordierite-forming raw material means a compound containing a silica source, an alumina source, and a magnesia source and convertible into cordierite by firing. Usually, it is the one in which these particles are mixed so that it has the theoretical composition ($2MgO.2Al_2O_3.5SiO_2$) of cordierite after firing.

In the present specification, "alumina source" means alumina, aluminum hydroxide, active alumina, or boehmite. Though particles of kaolin ($Al_2O_3.2SiO_2.2H_2O$) and mullite ($3Al_2O_3.2SiO_2$) can generally be used as an alumina source because they play roles of an alumina source and a silica source, they are not included in the "alumina source" of the present specification.

As a silica source, particles of silica, a silica-containing composite oxide, a substance converted into silica by firing, or the like, can be used. Specifically, particles of silica ($SiO_2$) including quartz, kaolin ($Al_2O_3.2SiO_2.2H_2O$), talc ($3MgO.4SiO_2.H_2O$), mullite ($3Al_2O_3.2SiO_2$), or the like, can be used. Though there is no particular limitation on the average particle size of the silica source particles, there are suitably used silica source particles having an average particle size of about 5 to 50 µm in the case of quartz, about 2 to 10 µm in the case of kaolin, about 5 to 40 µm in the case of talc, and about 2 to 20 µm in the case of mullite.

As a magnesia source, particles of magnesia, a magnesia-containing composite oxide, a substance converted into magnesia by firing, or the like, can be used. Specifically, particles of talc, magnesite ($MgCO_3$), or the like, can be used, and talc particles are preferable among them. Though there is no particular limitation on the average particle size of the magnesia source particles, there are suitably used magnesia source particles having an average particle size of about 5 to 40 µm (preferably 10 to 30 µm) in the case of talc, and about 4 to 8 µm in the case of magnesia particles.

Though examples of a dispersion medium added to the cordierite-forming raw material include water and a mixed solvent of water and an organic solvent such as alcohol, water can be used particularly suitably. When a cordierite-forming raw material and a dispersion medium are mixed together and kneaded, additives such as a pore-forming material, an organic binder, and a dispersant may further be added thereto.

Examples of the pore-forming material include carbon such as graphite, flour, starch, a phenol resin, poly(methyl methacrylate), polyethylene, and poly(ethylene terephthalate). Among them, a micro capsule made of an organic resin such as an acrylic resin can particularly suitably be used.

There may suitably be used, as an organic binder, hydroxypropylmethyl cellulose, methyl cellulose, hydroxyethyl cellulose, carboxylmethyl cellulose, poly(vinyl alcohol), or the like. There may suitably be used, as a dispersant, a substance having a surface active effect, for example, ethylene glycol, dextrin, fatty acid soap, and polyalcohol.

Incidentally, mixing and kneading of a cordierite-forming raw material and a dispersion medium may be conducted by a known mixing/kneading method. However, for the mixing, there is used a mixer capable of rotating a stirring blade at a high speed of 500 rpm or more (preferably 1000 rpm or more) and excellent in stirring force and dispersing force, and the mixture is conducted with applying shearing force. By such a mixing method, a cohesive mass contained in each raw material particles and causing an internal defect of a honeycomb structure obtained can be pulverized and disappeared.

The mixing can be conducted with a conventionally known mixer, for example, a sigma kneader, a ribbon mixer, or the like. In addition, the kneading can be conducted with a conventionally known kneader, for example, a sigma kneader, a Banbury mixer, a screw type extrusion kneader, or the like. Particularly, it is preferable to use a kneader (so-called vacuum kneading machine or biaxial continuous kneading extruder) provided with a vacuum apparatus (e.g., vacuum pump) in that clay having no defect and good formability can be obtained.

By forming the obtained clay by a forming method such as an extrusion forming method, a honeycomb formed body having a plurality of cells separated from each other by partition walls can be obtained. A preferable extrusion forming method is a method using a die having a desired cell shape, partition wall thickness, and cell density.

Next, the obtained honeycomb formed body is dried to obtain a honeycomb dried body. There is no particular limitation on a drying method, and there may be employed a conventionally known method such as hot air drying, microwave drying, dielectric drying, drying under reduced pressure, vacuum drying, or freeze drying. Among them, a drying method in combination of hot air drying with microwave drying or dielectric drying is preferable in that the whole formed body can be dried quickly and uniformly.

Next, the honeycomb dried body is fired to obtain a honeycomb structure. Since the firing conditions (temperature and time) depend on kind of each of the raw material particles constituting the honeycomb formed body, they may appropriately be determined according to these kinds. For example, it is preferable to fire at 1410 to 1440° C. for three to ten hours. When the firing conditions (temperature and time) are below the above ranges, cordierite crystallization of aggregate raw material particles tends to be insufficient. On the other hand, when the firing conditions exceed the above ranges, generated cordierite tends to melt.

It is preferable to remove organic substances (pore-forming material, organic binder, dispersant, etc.) in the honeycomb dried body by combustion (calcination) before firing or in a temperature rise process in firing because removal of the organic substances can further be accelerated. The combustion temperature of the organic binder is about 200° C., and the combustion temperature of the pore-forming temperature is about 300 to 1000° C. Therefore, the calcination temperature may be about 200 to 1000° C. Though the calcination time is not particularly limited, it is generally about 10 to 100 hours.

EXAMPLE

The present invention is hereinbelow described specifically on the basis of Examples. However, the present invention is not limited to these Examples. Incidentally, methods of measuring the various property values are shown below.

[Thermal Shock Resistance Test]

A honeycomb structure is put in an electric furnace heated in advance at a predetermined temperature to be heated for sufficient period of time till the whole honeycomb structure is at a predetermined temperature, followed by being air-cooled. A thermal shock due to quick cooling may cause cracks on a side face, on an end face, or inside the structure. In the case that no crack is caused upon cooling down to room temperature, the structure is considered that it has cleared the heating temperature. Cracks are detected by eye observation, strike sound, and the like. The honeycomb structure which has cleared the heating temperature is heated until a crack is caused by 50° C. The highest temperature with no crack caused is defined as "thermal shock resistance temperature (° C.).

[Percentage of Water Absorption]

After the honeycomb structure was boiled at 100° C. to allow it to absorb water sufficiently, humid air at 55° C. (humidity of 96% or more) was sent into the structure for three minutes, and surplus moisture adhering to a partition wall surface is removed. The amount of moisture (ratio to the mass of the honeycomb structure) absorbed in the honeycomb structure (taken by pored in the partition walls) is calculated from the following formula (2) as "percentage of water absorption".

Percentage of water absorption (%)=([mass of honeycomb structure after absorbing water]−[mass of honeycomb structure before absorbing water])/[mass of honeycomb structure before absorbing water]   (2)

[Drying/Firing Shrinkage Ratio]

The drying shrinkage ratio and the firing shrinkage ratio are calculated according to the following formulae (3) and (4). Incidentally, "size" in the following formulae (3) and (4) means "diameter" of the honeycomb structure.

Drying shrinkage ratio (%)=([size upon forming]−[size after drying])/[size upon forming]   (3)

Firing shrinkage ratio (%)=([size after drying]−[size after firing])/[size after drying]   (4)

Example 1

As shown in Table 1, 21% by mass of talc (average particle size: 8 μm, BET specific surface area: 11 m²/g), 19% by mass of talc (average particle size: 11 μm, BET specific surface area: 5 m²/g), 12% by mass of kaolin (average particle size: 9 μm, BET specific surface area: 7 m²/g), 32% by mass of calcined kaolin (average particle size: 3 μm, BET specific surface area: 10 m²/g), and 16% by mass of boehmite (average particle size: 0.5 μm, BET specific surface area: 20 m²/g) were mixed together to prepare a cordierite-forming raw material. To 100 parts by mass of the prepared cordierite-forming raw material were added 7 parts by mass of an organic binder (methyl cellulose, hydroxypropylmethyl cellulose), 1.5 parts by mass of a surfactant (sodium stearate), and 31 parts by mass of water, and they were put in a mixer for mixing for three minutes to obtain a wet mixture.

The obtained wet mixture was put in a screw type extrusion kneader and kneaded to give clay in a cylindrical shape. This clay was put in an extrusion forming machine for extrusion forming to give a honeycomb formed body. The obtained honeycomb formed body was subjected to dielectric drying and hot air drying, and then cut at both ends so as to have predetermined dimensions. Thus, a honeycomb dried body was obtained. The dried body obtained was fired at 1420 to 1440° C. for five hours to produce a cylindrical honeycomb structure (Example 1). The honeycomb structure had dimensions of 106 mm in diameter and 100 mm in whole length (length of passages) with a partition wall thickness of 63 μm and a cell density of 900 cells/in² (This cell structure has low thermal shock resistance temperature measured in the case of carrying out the thermal shock resistance test). Various property values of the honeycomb structure are shown in Table 3.

Examples 2 to 21, Comparative Examples 1 to 17

Honeycomb structures (Examples 2 to 21, Comparative Examples 1 to 17) were manufactured in the same manner as in Example 1 described above except for varying average particle sizes (μm), BET specific surface areas (m²/g), and mix proportions (mass %) of the various raw materials used as shown in Tables 1, 2, 4, and 5. Various property values of the honeycomb structures manufactured are shown in Tables 3 and 6.

TABLE 1

| | | Average particle size (μm) | BET specific surface area (m²/g) | Example 1 | 2 | 3 |
|---|---|---|---|---|---|---|
| | | | | Mix proportion (mass %) | | |
| Talc | | 8 | 11 | 21 | 12 | 12 |
| | | 11 | 5 | 19 | 28 | 28 |
| Kaolin | | 9 | 7 | 12 | 17 | 17 |
| Calcined kaolin | | 3 | 10 | 32 | 17 | 17 |
| Silica | | 4 | 3.5 | | 6 | 6 |
| Alumina source | Alumina | 4 | 1.5 | | 14 | 14 |
| | Boehmite | 0.11 | 160 | | 6 | |
| | | 0.5 | 20 | 16 | | |
| | | 0.5 | 80 | | | 6 |
| Alumina source | Average particle size (μm) | | | 0.5 | 2.9 | 3 |
| | BET specific surface area (m²/g) | | | 20 | 48.2 | 24.8 |
| Cell structure | Partition wall thickness (μm) | | | 63 | 63 | 63 |
| | Cell density (cell/inch²) | | | 900 | 900 | 900 |

TABLE 2

| | Average particle size (μm) | BET specific surface area (m²/g) | 4 | 5 | 6 | 7 | 8 | 9 | 10 | 11 | 12 | 13 | 14 |
|---|---|---|---|---|---|---|---|---|---|---|---|---|---|
| | | | | | | | Example | | | | | | |
| | | | | | | | Mix proportion (mass %) | | | | | | |
| Talc | 8 | 11 | 13 | 12 | 12 | 12 | 12 | 12 | 12 | 12 | 12 | 11 | 12 |
| | 11 | 5 | 28 | 29 | 29 | 28 | 28 | 30 | 30 | 28 | 28 | 27 | 27 |
| Kaolin | 9 | 7 | 17 | 17 | 17 | 17 | 17 | 16 | 16 | 19 | 15 | 15 | 15 |
| Calcined kaolin | 3 | 10 | 17 | 17 | 17 | 17 | 17 | 16 | 16 | 19 | 15 | 15 | 15 |
| Silica | 4 | 3.5 | 5 | 5 | 5 | 5 | 5 | 5 | 5 | 3 | 7 | 5 | 5 |

TABLE 2-continued

| | | Average particle size (μm) | BET specific surface area (m²/g) | | | | | | | | | | | |
|---|---|---|---|---|---|---|---|---|---|---|---|---|---|---|
| Alumina source | Alumina | 4 | 1.5 | 18 | 16 | 14 | 13 | 11 | 9 | 7 | 13 | 16 | 23 | 0 |
| | Aluminum hydroxide | 2 | 15 | 0 | 0 | 0 | 0 | 0 | 0 | 0 | 0 | 0 | 0 | 18 |
| | Boehmite | 0.11 | 160 | 2 | 4 | 6 | 8 | 10 | 12 | 14 | 6 | 7 | 4 | 9 |
| Alumina source | Average particle size (μm) | | | 3.6 | 3.2 | 2.8 | 2.5 | 2.1 | 1.8 | 1.5 | 2.8 | 2.9 | 3.4 | 2.8 |
| | BET specific surface area (m²/g) | | | 17.7 | 33.3 | 48.6 | 63.3 | 77.7 | 91.6 | 105.2 | 48.9 | 48.3 | 25.3 | 50.6 |
| Cell structure | Partition wall thickness (μm) | | | 63 | 63 | 63 | 63 | 63 | 63 | 63 | 63 | 63 | 63 | 63 |
| | Cell density (cell/inch²) | | | 900 | 900 | 900 | 900 | 900 | 900 | 900 | 900 | 900 | 900 | 900 |

| | | Average particle size (μm) | BET specific surface area (m²/g) | Example | | | | | | |
|---|---|---|---|---|---|---|---|---|---|---|
| | | | | 15 | 16 | 17 | 18 | 19 | 20 | 21 |
| | | | | Mix proportion (mass %) | | | | | | |
| Talc | | 8 | 11 | 12 | 21 | 21 | 21 | 18 | 18 | 18 |
| | | 11 | 5 | 26 | 19 | 19 | 19 | 21 | 21 | 21 |
| Kaolin | | 9 | 7 | 16 | 21 | 21 | 21 | 16 | 16 | 16 |
| Calcined kaolin | | 3 | 10 | 16 | 21 | 21 | 21 | 20 | 20 | 20 |
| Silica | | 4 | 3.5 | 5 | 0 | 0 | 0 | 4 | 4 | 4 |
| Alumina source | Alumina | 4 | 1.5 | 0 | 8 | 8 | 7 | 9 | 8 | 8 |
| | Aluminum hydroxide | 2 | 15 | 13 | 8 | 8 | 7 | 12 | 12 | 11 |
| | Boehmite | 0.11 | 160 | 12 | 0.48 | 1.19 | 2.38 | 0.48 | 1.19 | 2.38 |
| Alumina source | Average particle size (μm) | | | 2.1 | 2.9 | 2.8 | 2.6 | 2.8 | 2.7 | 2.5 |
| | BET specific surface area (m²/g) | | | 77.9 | 12.5 | 18.8 | 29.3 | 12.9 | 17.9 | 26.4 |
| Cell structure | Partition wall thickness (μm) | | | 63 | 63 | 63 | 63 | 63 | 63 | 63 |
| | Cell density (cell/inch²) | | | 900 | 900 | 900 | 900 | 900 | 900 | 900 |

TABLE 3

| | Thermal expansion coefficient (×10⁻⁶/° C.) | Thermal shock resistance temperature (° C.) | Water absorption ratio (mass %) | Porosity (%) | Average pore diameter (μm) | Firing shrinkage ratio (%) | Drying + Firing shrinkage ratio (%) |
|---|---|---|---|---|---|---|---|
| Example 1 | 0.22 | 800 | 14.3 | 27.2 | 3.72 | 8.4 | 13.1 |
| Example 2 | 0.13 | 850 | 18.7 | 31.9 | 4.55 | 3.2 | 8.6 |
| Example 3 | 0.25 | 800 | 21.2 | 35.5 | 4.43 | 3.1 | 7.8 |
| Example 4 | 0.19 | 800 | 21.9 | 35.9 | 4.87 | 2.1 | 6.2 |
| Example 5 | 0.16 | 800 | 19.5 | 32.8 | 4.6 | 2.7 | 7.2 |
| Example 6 | 0.13 | 850 | 18.2 | 31 | 4.44 | 3.2 | 8.1 |
| Example 7 | 0.1 | 850 | 16.1 | 30 | 4.22 | 3.8 | 9.1 |
| Example 8 | 0.08 | 900 | 13.9 | 28 | 4 | 4.4 | 10.4 |
| Example 9 | 0.06 | 900 | 12.4 | 26.5 | 3.76 | 5 | 11.2 |
| Example 10 | 0.05 | 900 | 10.4 | 25.1 | 3.11 | 5.5 | 12.3 |
| Example 11 | 0.15 | 850 | 17.3 | 30.6 | 4.3 | 3.8 | 8.5 |
| Example 12 | 0.17 | 850 | 18.9 | 32.6 | 4.5 | 2.7 | 7.7 |
| Example 13 | 0.16 | 800 | 18.3 | 34.3 | 3.95 | 6.2 | 11.3 |
| Example 14 | 0.1 | 850 | 15.6 | 32 | 3.65 | 6.7 | 12.2 |
| Example 15 | 0.05 | 900 | 11.8 | 28.3 | 3.22 | 7 | 13.9 |
| Example 16 | 0.25 | 750 | 15.9 | 26 | 4.59 | 6.1 | 10.7 |
| Example 17 | 0.21 | 800 | 15.3 | 25.3 | 4.54 | 6.1 | 10.8 |
| Example 18 | 0.2 | 800 | 15.4 | 25.2 | 4.51 | 6.2 | 11.1 |
| Example 19 | 0.25 | 700 | 21.3 | 34.3 | 4.6 | 4.5 | 8.9 |
| Example 20 | 0.21 | 750 | 20.6 | 33.5 | 4.72 | 4.5 | 9 |
| Example 21 | 0.19 | 800 | 19.8 | 33.3 | 4.62 | 4.7 | 9.5 |

TABLE 4

| | Average particle size (μm) | BET specific surface area (m²/g) | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| | | | Mix proportion (mass %) | | | | | | | | | |
| Talc | 8 | 11 | 21 | 12 | 20 | 22 | 21 | 21 | 21 | 21 | 12 | 12 |
| | 11 | 5 | 19 | 27 | 18 | 19 | 19 | 19 | 19 | 19 | 29 | 29 |
| Kaolin | 9 | 7 | 21 | 16 | 12 | 22 | 12 | 12 | 12 | 12 | 16 | 16 |
| Calcined kaolin | 3 | 10 | 21 | 19 | 30 | 22 | 32 | 32 | 32 | 32 | 17 | 17 |

TABLE 4-continued

| | | Average particle size (μm) | BET specific surface area (m²/g) | Comparative Example |   |   |   |   |   |   |   |   |   |
|---|---|---|---|---|---|---|---|---|---|---|---|---|---|
| | | | | 1 | 2 | 3 | 4 | 5 | 6 | 7 | 8 | 9 | 10 |
| | | | | Mix proportion (mass %) | | | | | | | | | |
| | Silica | 4 | 3.5 | | | 4 | | | | | | 5.5 | 5.5 |
| Alumina source | Alumina | 4 | 1.5 | 9 | 9 | | | | | | | 15 | 15 |
| | | 1 | 10 | | | | 15 | | | | | | |
| | Aluminum hydroxide | 2 | 15 | 9 | 13 | | | | | | | | |
| | Boehmite | 0.22 | 100 | | | | | | | | 16 | | |
| | | 0.12 | 130 | | | | | | | 16 | | | |
| | | 0.11 | 160 | | | | | | 16 | | | | |
| | | 0.09 | 180 | | | | | 16 | | | | | |
| | | 6 | 230 | | | | | | | | | 6 | |
| | | 4 | 200 | | | | | | | | | | 6 |
| | active alumina | 8 | 20 | | | | 20 | | | | | | |
| Alumina source | Average particle size (μm) | | | 3 | 2.8 | 8 | 1 | 0.1 | 0.1 | 0.1 | 0.2 | 4.6 | 4 |
| | BET specific surface area (m²/g) | | | 8.3 | 9.5 | 20 | 10 | 180 | 160 | 130 | 100 | 67.5 | 59 |
| Cell structure | Partition wall thickness (μm) | | | 63 | 63 | 63 | 63 | 63 | 63 | 63 | 63 | 63 | 63 |
| | Cell density (cell/inch²) | | | 900 | 900 | 900 | 900 | 900 | 900 | 900 | 900 | 900 | 900 |

TABLE 5

| | | Average particle size (μm) | BET specific surface area (m²/g) | Comparative Example |   |   |   |   |   |   |
|---|---|---|---|---|---|---|---|---|---|---|
| | | | | 11 | 12 | 13 | 14 | 15 | 16 | 17 |
| | | | | Mix proportion (mass %) | | | | | | |
| | Talc | 8 | 11 | 21 | 13 | 12 | 11 | 12 | 2 | 18 |
| | | 11 | 5 | 19 | 29 | 29 | 27 | 27 | 18 | 21 |
| | Kaolin | 9 | 7 | 6 | 17 | 16 | 15 | 16 | 22 | 16 |
| | Calcined Kaolin | 3 | 10 | 16 | 17 | 16 | 15 | 16 | 22 | 2 |
| | Silica | 4 | 3.5 | 1 | 5 | 5 | 5 | 5 | | 4 |
| Alumina source | Alumina | 4 | 1.5 | | 19 | 6 | 27 | 8 | 9 | 9 |
| | Aluminum hydroxide | 2 | 15 | | | | | | 9 | 12 |
| | Boehmite | 0.11 | 160 | 28 | | 16 | | 16 | | |
| Alumina source | Average particle size (μm) | | | 0.1 | 4 | 1.1 | 4 | 1.4 | 3 | 2.8 |
| | BET specific surface area (m²/g) | | | 160 | 1.5 | 118.4 | 1.5 | 106.7 | 9.3 | 10.3 |
| Cell structure | Partition wall thickness (μm) | | | 63 | 63 | 63 | 63 | 63 | 63 | 63 |
| | Cell density (cell/inch²) | | | 900 | 900 | 900 | 900 | 900 | 900 | 900 |

TABLE 6

| | Thermal expansion coefficient (×10⁻⁶/° C.) | Thermal shock resistance temperature (° C.) | Water absorption ratio (mass %) | Porosity (%) | Average pore diameter (μm) | Firing shrinkage ratio (%) | Drying + Firing shrinkage ratio (%) |
|---|---|---|---|---|---|---|---|
| Comp. Ex. 1 | 0.3 | 750 | 16.3 | 27.4 | 4.84 | 6.7 | 10.7 |
| Comp. Ex. 2 | 0.3 | 700 | 21.3 | 35.1 | 4.55 | 4.4 | 8.6 |
| Comp. Ex. 3 | 0.67 | 600 | 21.9 | 29 | 7.89 | 6.9 | 11.3 |
| Comp. Ex. 4 | 0.58 | 600 | 14.3 | 29.1 | 4 | 7.3 | 10.8 |
| Comp. Ex. 5 | 0.01 | 900 | 2 | 11.7 | 2.11 | 10.7 | 18.8 |
| Comp. Ex. 6 | 0.01 | 900 | 2 | 11.6 | 1.99 | 11 | 18.2 |
| Comp. Ex. 7 | 0.07 | 900 | 2.3 | 13.1 | 2.17 | 11.1 | 17.9 |
| Comp. Ex. 8 | 0.11 | 900 | 4.3 | 17 | 2.44 | 10.5 | 17.1 |
| Comp. Ex. 9 | 0.58 | 650 | 26.4 | 39 | 5.82 | 1.7 | 5.8 |
| Comp. Ex. 10 | 0.45 | 650 | 24.9 | 37.7 | 5.33 | 1.8 | 6.5 |
| Comp. Ex. 11 | 0.07 | 900 | 4.7 | 18.1 | 1.65 | 8.4 | 18.7 |
| Comp. Ex. 12 | 0.45 | 650 | 24.5 | 37.7 | 5.03 | 1.6 | 4.8 |
| Comp. Ex. 13 | 0.03 | 900 | 9.2 | 23.6 | 3.08 | 6.1 | 13.3 |
| Comp. Ex. 14 | 0.28 | 700 | 20.2 | 36.2 | 3.99 | 5.8 | 10.5 |
| Comp. Ex. 15 | 0.02 | 900 | 9.1 | 25.3 | 2.99 | 7.4 | 14.9 |
| Comp. Ex. 16 | 0.28 | 750 | 16.2 | 27.3 | 4.48 | 6.1 | 10.3 |
| Comp. Ex. 17 | 0.27 | 700 | 21.3 | 34.7 | 4.39 | 4.4 | 8.8 |

It is clear from the results shown in Tables 3 and 6 that a honeycomb structure having a small thermal expansion coefficient and excellent thermal shock resistance when a fine boehmite is used as an alumina source. Further, it became clear that a honeycomb structure can have further excellent thermal shock resistance when boehmite having a high BET specific surface area is used as an alumina source (see Examples 2 and 3). Incidentally, when an excess amount of boehmite is used, deformation is prone to be caused because of high drying/firing shrinkage ratio, and a honeycomb structure obtained tends to have lowered porosity (see Comparative Example 5 to 8, 11, 13, and 15). However, it became clear that, by allowing a cordierite-forming raw material to contain silica, water absorption ratio and shrinkage ratio can be corrected, and it is possible to manufacture a honeycomb structure having a low thermal expansion coefficient, excellent thermal shock resistance, high porosity, and large average pore diameter.

A honeycomb structure of the present invention has excellent thermal shock resistance even with large pore diameters and high porosity. Therefore, it is suitable as a filter for removing harmful substances such as particulate and $NO_x$ contained in exhaust gas discharged from automobile engines such as a diesel engine or as a catalyst carrier.

What is claimed is:

1. A method for manufacturing a honeycomb structure, comprising:
    forming clay comprising cordierite-forming raw material in a honeycomb shape to obtain a formed body, the cordierite-forming raw material comprising:
        13 to 28% by mass of an alumina source having a BET specific surface area of 10 $m^2/g$ or more, the alumina source comprising 0.45 to 15.8% by mass of Boehmite ($Al_2O_3.H_2O$), with respect to the cordierite-forming raw material, having an average particle size of 1 μm or less and the alumina source further comprising 4-28% by mass of aluminum hydroxide; and
    drying and firing the formed body to obtain a honeycomb structure having a plurality of cells separated from each other by porous partition walls and functioning as fluid passages;
    wherein the boehmite ($Al_2O_3.H_2O$) has a BET specific surface area of 80 $m^2/g$ or more, the cordierite-forming raw material further comprises 8% by mass or less of silica, the silica has an average particle diameter between 4 μm and 50 μm, and the honeycomb structure has:
        a thermal expansion coefficient of $0.25\times10^{-6}/°$ C. or less,
        an average pore diameter is 3 to 8 μm, and
        a porosity of 25% or more.

2. A method for manufacturing a honeycomb structure according to claim 1, wherein the alumina source further comprises alumina.

3. A method for manufacturing a honeycomb structure according to claim 1, wherein the alumina source has a BET specific surface area of 20 $m^2/g$ or more.

4. A method for manufacturing a honeycomb structure according to claim 1, wherein the honeycomb structure has a porosity of 30% or more.

5. A method for manufacturing a honeycomb structure according to claim 1, wherein the cordierite-forming raw material includes 0.5% by mass of silica.

6. A method for manufacturing a honeycomb structure according to claim 1, wherein the cordierite-forming raw material includes talc having a particle size of 10 to 30 μm.

* * * * *